United States Patent
Göhrle et al.

(10) Patent No.: US 9,902,228 B2
(45) Date of Patent: Feb. 27, 2018

(54) METHOD FOR CONTROLLING AN ACTUATOR

(71) Applicant: AUDI AG, Ingolstadt (DE)

(72) Inventors: Christoph Göhrle, Ingolstadt (DE);
Andreas Schindler, Ingolstadt (DE);
Andreas Unger, Gaimersheim (DE);
Oliver Sawodny, Stuttgart (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/036,309

(22) PCT Filed: Nov. 7, 2014

(86) PCT No.: PCT/EP2014/002993
§ 371 (c)(1),
(2) Date: May 12, 2016

(87) PCT Pub. No.: WO2015/070966
PCT Pub. Date: May 21, 2015

(65) Prior Publication Data
US 2016/0263959 A1    Sep. 15, 2016

(30) Foreign Application Priority Data

Nov. 13, 2013  (DE) .................. 10 2013 018 924

(51) Int. Cl.
*B60G 17/0165*  (2006.01)
*B60G 17/018*  (2006.01)

(52) U.S. Cl.
CPC ....... *B60G 17/0165* (2013.01); *B60G 17/018* (2013.01); *B60G 2400/82* (2013.01);
(Continued)

(58) Field of Classification Search
CPC .... A01B 79/005; B60G 11/27; B60G 17/005; B60G 17/0525; B60G 2300/08; B60G 3/01; B60G 7/0007
(Continued)

(56) References Cited

U.S. PATENT DOCUMENTS 5,163,319  A    11/1992  Spies et al.
8,762,000  B2    6/2014  Schindler et al.
(Continued)

FOREIGN PATENT DOCUMENTS

CN    203276595 U  * 11/2013  ............... G08G 1/14
CN    106080480 A  * 11/2016  ........... B60R 21/013
(Continued)

OTHER PUBLICATIONS

International Search Report issued by the European Patent Office in International Application PCT/EP2014/002993.

*Primary Examiner* — Anne M Antonucci
*Assistant Examiner* — Sanjeev Malhotra
(74) *Attorney, Agent, or Firm* — Henry M. Feiereisen LLC

(57) ABSTRACT

A method for controlling at least one actuator of a chassis of a motor vehicle, which travels over a subsurface is disclosed, wherein a height profile of the subsurface is detected, wherein it is analyzed for a section of the subsurface whether the height profile along said section has a value which deviates from a threshold value by a specified tolerance value, and wherein a regulating variable for activating the actuator is adjusted in consideration of the identified unevenness when the motor vehicle travels over the identified unevenness.

9 Claims, 3 Drawing Sheets

(52) U.S. Cl.
CPC .... *B60G 2400/821* (2013.01); *B60G 2401/14* (2013.01); *B60G 2401/174* (2013.01); *B60G 2401/176* (2013.01); *B60G 2401/21* (2013.01); *B60G 2500/10* (2013.01); *B60G 2600/02* (2013.01); *B60G 2600/60* (2013.01); *B60G 2800/70* (2013.01)

(58) Field of Classification Search
USPC ......... 701/50, 70, 301, 448, 468; 280/6.157, 280/124.16, 124.157; 180/65.51, 68.5; 414/809; 345/173
See application file for complete search history.

(56) References Cited

U.S. PATENT DOCUMENTS

| | | | |
|---|---|---|---|
| 9,108,482 B2 | 8/2015 | Mohrlock et al. | |
| 9,205,874 B2 | 12/2015 | Schindler et al. | |
| 9,321,323 B2 | 4/2016 | Schindler et al. | |
| 2001/0018638 A1* | 8/2001 | Quincke | A01B 79/005 701/468 |
| 2003/0187560 A1* | 10/2003 | Keller | A01B 79/005 701/50 |
| 2004/0223662 A1* | 11/2004 | Urano | G06T 3/403 382/299 |
| 2006/0119064 A1* | 6/2006 | Mizuno | B60G 17/056 280/124.157 |
| 2007/0185652 A1* | 8/2007 | Salmon | G05D 1/0646 701/301 |
| 2008/0074522 A1* | 3/2008 | Hunter | H04N 5/23245 348/300 |
| 2009/0024311 A1* | 1/2009 | Hess | G01C 23/005 701/448 |
| 2009/0097038 A1 | 4/2009 | Higgins-Luthman et al. | |
| 2010/0117319 A1* | 5/2010 | Grozev | B60G 15/12 280/124.16 |
| 2011/0135439 A1* | 6/2011 | Cullum | B64F 1/32 414/809 |
| 2012/0050198 A1* | 3/2012 | Cannon | A63F 13/245 345/173 |
| 2012/0121208 A1* | 5/2012 | Moriya | G06T 3/4007 382/300 |
| 2013/0099455 A1 | 4/2013 | Beringer et al. | |
| 2013/0103259 A1 | 4/2013 | Eng et al. | |
| 2013/0180790 A1* | 7/2013 | Bisror | B60N 2/005 180/68.5 |
| 2013/0321447 A1* | 12/2013 | Horovitz | A63F 13/06 345/589 |
| 2014/0039758 A1 | 2/2014 | Schindler et al. | |
| 2014/0232083 A1 | 8/2014 | Mohrlock et al. | |
| 2014/0319787 A1 | 10/2014 | Schindler et al. | |
| 2015/0102570 A1* | 4/2015 | Slawson | B60G 17/005 280/6.157 |
| 2015/0165862 A1 | 6/2015 | Schindler et al. | |
| 2016/0037708 A1* | 2/2016 | Johnson | A01B 69/008 701/70 |
| 2016/0193889 A1* | 7/2016 | Slawson | B60G 17/005 180/65.51 |

FOREIGN PATENT DOCUMENTS

| | | | | |
|---|---|---|---|---|
| DE | 37 38 221 | | 6/1989 | |
| DE | 41 19 494 | | 1/1992 | |
| DE | 10 2006 010 101 | | 9/2007 | |
| DE | 10 2008 007 657 | | 8/2009 | |
| DE | 10 2008 032 545 | | 1/2010 | |
| DE | 10 2012 218 937 | | 4/2013 | |
| EP | 0 412 719 | | 2/1991 | |
| GB | 2494528 | | 3/2013 | |
| JP | 2000-74682 | | 3/2000 | |
| JP | 2010075107 A | * | 4/2010 | ............ A01C 11/02 |
| WO | WO 2009/097947 | | 8/2009 | |

* cited by examiner

METHOD FOR CONTROLLING AN ACTUATOR

CROSS-REFERENCES TO RELATED APPLICATIONS

This application is the U.S. National Stage of International Application No. PCT/EP2014/002993, filed Nov. 7, 2014, which designated the United States and has been published as International Publication No WO 2015/070966 and which claims the priority of German Patent Application, Serial No. 10 2013 018 924.1, filed Nov. 13, 2013, pursuant to 35 U.S.C. 119(a)-(d).

BACKGROUND OF THE INVENTION

The invention relates to a method and a system for controlling at least one actuator of a chassis of a motor vehicle.

A motor vehicle includes a variety of sensors for detecting operating parameters and an environment, in particular a road, in front of the motor vehicle and a variety of actuators for acting on components of the motor vehicle. A manipulated variable for actuation of a component by the actuator is hereby derived from at least one value of a sensor.

The published document WO 2009/097947 A1 describes a method for influencing an active chassis of a vehicle, wherein a height profile of a road is determined and the chassis is influenced in dependence on the determined values of the height profile. In filtering step of the method, a filtered height profile is formed from the height profile, from which a desired position of a superstructure of the vehicle and/or a setpoint value therefor is or are determined.

From the published document DE 10 2008 032 545 A1 an influencing system of an active chassis of a motor vehicle is known with which an input signal for a adjustment of a superstructure of the chassis is calculated from a pilot-control variable. In addition it is provided to predict a behavior of the motor vehicle at each time point by way of a model and to compare the predicted behavior with an actual behavior of the motor vehicle.

SUMMARY OF THE INVENTION

In light of the above a method and a system with the features of the independent patent claims is disclosed. Further embodiments of the invention are set forth in the dependent patent claims and the description.

The method according to the invention is configured for controlling at least one actuator of a chassis of a motor vehicle, which drives on a subsurface. Hereby a height profile of the ground is detected, wherein an analysis is performed for a section, whether the height profile has a value along this section, which deviates by a predetermined tolerance value form a predetermined threshold value. A manipulated variable for impinging the at least one actuator is adjusted by taking an identified unevenness into account when the motor vehicle drives over the identified unevenness.

Within the framework of the invention the section of the subsurface is defined as unevenness when the value of the height profile is greater than the threshold value plus the tolerance value.

According to a possible embodiment of the method according to the invention a shape of a height profile along the section is described by a function that depends on at least one parameter. For a point of the subsurface a dependence of the height profile from a position of the point along the section is defined with the function for describing the height profile, which depends on the at least one parameter.

Values of the height profile for the subsurface are determined with a sensor for detecting an environment of the motor vehicle. The determined values are filtered along the section.

All values of the height profile are determined by a sensor for determining an environment of the motor vehicle, wherein a value of the height profile is assigned to a point x along a section. All determined values of the height profile for all points along the section are filtered, for example high pass filtered or low pass filtered.

An identified unevenness of the height profile is compensated with the at least one actuator. When no unevenness is detected, the height profile is set to a constant value, for example zero, and/or the predictive function is deactivated, because in this case an even subsurface, which is subject to measurement noise, is assumed.

In an embodiment the section is identified as unevenness of the subsurface when a value of a change of the function deviates in dependence on the position of the point along the section by a predetermined tolerance value from a predetermined threshold value for the change of the function. Hereby the first spatial derivative of the function in horizontal direction along the section can be used as change of the function. Alternatively or in addition the second local derivative in horizontal direction along the section can be used as change of the function.

For an identified unevenness a beginning and an end are determined in horizontal direction along the section. The beginning and the end can be determined via a gradient-based variant of the method, wherein the function for describing the height profile is determined from the low pass or high pass filtered values of the height profile. In addition extrema of the function and the first and second derivative of the function are analyzed.

Hereby bends and/or corners in the height profile can be searched for, wherein such bends and/or corners are defined as the beginning or the end of an identified unevenness. Along the phase-free low-pass filtered height profile minima and maxima of the first and/or second derivative of the function can be searched for. A beginning or an end of the unevenness is determined via a deviation of the first and/or second derivative from the threshold value by the tolerance value. As an alternative, the height profile can be folded with a corresponding weighting function, which corresponds to the application of a moving average filter (weighted moving average) of the height profile with the defined weighting function.

Thus it can be tested by analyzing a first and/or second derivative of the function for describing the height profile and by comparison with a predetermined threshold value, whether an unevenness is present along an analyzed section and where this unevenness starts and ends.

In an embodiment the height profile, first preprocessed by a high-pass and low-pass filtering as mentioned above for detecting defined unevennessess, so that the height profile extends about a zero line. Then values are searched that are greater, at least by the threshold value, than the defined tolerance value. Based on such values the local height profile is searched towards the right and towards the left until values of the height profile fall below the tolerance value plus the threshold value, i.e., for example until they become smaller than 0.5 cm, or until a further characteristic threshold value is reached, when for example the filtered first derivative shows a change in sign and the second filtered derivative has an extremum, which indicates the beginning and the end of the unevenness.

As explained in more detail below, for identifying unevennesses a comparison of measured absolute values of the height profile, which is described by an actual geometry, with predetermined values of a height profile that can be described by way of a target geometry, can be performed.

In this regard in a method for controlling the at least one actuator, it is analyzed whether an actual geometry of the height profile has a shape along the section that is comparable with a shape of a target geometry. Hereby in a further embodiment the actual geometry of the height profile is described with the function, which depends on the at least one parameter, wherein the actual geometry is compared with the target geometry provided for the height profile. The section is identified as unevenness when the actual geometry deviates from a threshold value which is predetermined for the target geometry by a tolerance value which is predetermined for the target geometry.

The shape of the actual geometry as well as the shape of the target geometry are defined by the function for describing the height profile along the section, which is dependent from the at least one parameter, wherein the at least one parameter of the function for describing the actual geometry has an actual value and the at least one parameter of the function for describing the target geometry has a target value.

The target geometry can also be used as template for the actual geometry.

Thus different target geometries with different shapes can be used. Such target geometries can also be referred to as predetermined or defined geometries. For searching for the unevenness in the height profile, the height profile, which is usually detected with sensors, is described by the actual geometry. Further all predetermined or defined target geometries can be compared with the detected actual geometry of the height profile. As soon as a target geometry with a matching shape has been determined for an actual geometry along the section of the height profile from a plurality of target geometries, it is tested whether and in how far the shape of the actual geometry deviates from the shape of the target geometry.

In an embodiment of the method the function provided for describing the actual geometry and the target geometry is configured as a polynomial of the n-th degree. For a function $h(x)$, which depends from at least one parameter $a_k$, and is configured as a polynomial and has at least one member $a_k*X^k$, wherein a parameter $a_k$ is assigned to a k-th power of x, usually the following relationship applies: $h(x)=a_n*X^n + a_n-1*X^{n-1} + \ldots a_2*x^2+a_1*x+a_0$. Hereby x is provided as a variable, which within the framework of the method extends for a location or position along the height profile or at least along the section to be analyzed of the height profile. In an analysis of a section of the height profile, parameters $a_{k,target}=a_{n,garet}, a_{n-1,target}, \ldots, a_{k,target}, a_{1,target}, a_{0,target}$, which are provided as or are definable as target values, are used for describing the function for defining the target geometry. On the other hand parameters $a_{k,actual}=a_{n,actual}, a^{n-1,actual}, \ldots, a_{2actual}, a_{1,actual}, a_{0,actual}$ that are provided as or are definable as and/or are determinable as actual values are used for the parameter-dependent function for describing the actual geometry. When performing the method it is also possible to determine a potentially present unevenness based on the comparison of the parameters $a_{k,target}$ of the function for describing the target geometry, which are provided as target values, with the parameters $a_{k,actual}$ of the function for describing the actual geometry, which are configured as actual values, wherein an unevenness can be identified when an actual value of a parameter $a_{k,actual}$ deviates for a k-th power of the function for the actual geometry at least by a predetermined threshold value from a tolerance value of a parameter $a_{k,target}$, which is configured as target value for a k-th power of the function for describing the target geometry. In an embodiment such a function can for example be configured as a trigonometric function.

With the parameter-dependent function $h(x)$ for describing the height profile, a dependence of the height profile from a position of a point x along the section is defined for the point x of the subsurface.

The analyzed section is identified as unevenness of the subsurface when an absolute value of the function of the actual geometry deviates in a point x by a tolerance value, which is predetermined for the target geometry, from a threshold that is predetermined from the target geometry. In an embodiment the target geometry is shifted over the actual geometry of the height profile and a difference between the target geometry and the actual geometry is calculated for each point along the section. Further all differences are summed up along the section. When the formed sum of the differences falls below a threshold value an unevenness that extends along the section is recognized. In an embodiment an unevenness can be identified in that a fit-value between the target geometry and the actual geometry is exceeded.

Hereby the section of the subsurface is defined as unevenness when the value of the function of the actual-geometry is greater than the threshold value plus the tolerance value of the target geometry. It is thus tested in how far a value for an absolute height of the profile, which is described by the actual geometry, deviates from a value for the absolute height that is predetermined by the target geometry. Consequently the section of the subsurface may alternatively or additionally also be defined as unevenness when the value of the function of the actual geometry is smaller than the threshold value minus the tolerance value of the target geometry.

In a further embodiment the section is identified as unevenness of the subsurface when a value of a change of the function of the actual geometry deviates in dependence on the position of the point along the section by a tolerance value, which is predetermined for the target geometry, from a threshold value of the change of the function, which threshold value is predetermined for the target geometry. Hereby the section of the subsurface is defined as unevenness, which the detected value of the change of the function of the actual geometry is greater than the threshold value plus the tolerance value. Further the first local derivative and/or the second local derivative of the function in horizontal direction along the section is used as change of the function.

For an identified unevenness a beginning and an end are determined in horizontal direction along the section. It is thus determined where the unevenness starts and where it ends.

In addition the target geometry can be used as a template for the actual geometry, wherein this template is also used for identifying an unevenness.

The system according to the invention is configured for controlling at least one actuator of a chassis of a motor vehicle, which drives on a subsurface. Hereby the system has at least one sensor for detecting an environment of the motor vehicle and a data processing device. The at least one sensor is configured to analyze, for a section of the subsurface, whether the height profile along this section has a value which deviates from a threshold value by a predetermined tolerance value, and to set a manipulated variable for impinging the actuator by taking the identified unevenness into account, when the motor vehicle drives over the identified unevenness.

With this system, which is arranged in the motor vehicle, at least one step of the disclosed method according to the invention can be performed.

The method enables a control and with this a closed loop and/or open loop control for an actuator of a so-called forward-looking chassis. Hereby a sensor of the motor vehicle, which is configured for recognizing the environment of the motor vehicle, for example a mono-sensor and/or a stereo-sensor, which detects the environment based on electromagnetic waves for example video, laser or radar based, recognizes a height profile of an subsurface situated in front of the motor vehicle, usually a road.

Raw data or values of the at least one sensor are processed and based thereon a height profile for discrete points of each subsurface is provided. Hereby for example values for the height profile along the subsurface in a section from 0 to 20 m in driving direction in front of the motor vehicle or in a section of 15 m behind the motor vehicle with regard to its driving direction are taken into account, wherein such values of the height profile can be equidistant for minimal sections, or non-equidistant. The detected height profile of the subsurface is only used for regulating the at least one actuator when a greater unevenness is present, wherein a greater unevenness in one embodiment per definition has a height whose value is greater than a threshold value and thus deviates from a defined threshold value by at least a defined tolerance value. Accordingly the forward-looking closed loop or open loop control for the actuator is only activated when recognizing an unevenness of such a degree. Detected smaller unevennesses with smaller values for the height may be due to noise in a sensor and thus do not reflect the real height profile of the road, and therefore such small unevennesses are not reacted to.

Within the framework of the invention the height profile is processed according to at least one of three possible variants described above, so that either only one variant or a combination of multiple variants is used. With the method defined unevennesses are detected in a height profile of the subsurface that is detected with sensors.

According to a first variant, unevennesses with defined geometric shapes are searched for in the detected height profile, which are here described by a predetermined target geometry. Hereby an unevenness is defined by its length L in horizontal direction along the section of the subsurface and its height h in vertical direction. For searching the unevenness, values of the length L and height h of the geometric shape or the actual geometry compared to the target geometry can be varied. In addition unevenesses of the height profile in front of the motor vehicle are compared with the provided geometric shape and thus with the target geometry, wherein the geometric shape, i.e., the target geometry is superimposed during an analysis over the detected height profile that is to be described by the actual geometry and when the actual geometry deviates from the target geometry at least one unevenness of the height profile is determined. In case of a deviation no unevenness is recognized because a target geometry can represent unevennesses. For this, for comparison with the actual geometry, the target geometry is shifted to the left or the right along the actual geometry. Hereby parameters for the function for describing the target geometry that are defined as target values can be adjusted. When the deviation of the actual geometry from the target geometry is sufficiently small the sensorically detected height profile is represented from beginning to end by a template and/or the template itself is used as the height profile for a regulation, wherein such a template is described or represented by way of the target geometry.

According to a second variant the height profile is rotated and subjected to a phase-free high-pass filtering, which eliminates a rotation or an offset of the height profile. Thereafter unevennesses are searched for via values for the height, which values are greater than a threshold value defined for the height, and thus deviate from the defined threshold value at least by a defined tolerance value. In order to determine a starting and end point for an unvevenness, the height profile, starting from a maximal value of the unevenness, is analyzed along the height profile in horizontal direction towards the right and left until a predetermined threshold value or tolerance value is fallen below and/or a slope of the height profile reverses and/or until along the height profile a predetermined threshold, which indicates a bend or a corner is exceeded or fallen below, which enables finding a starting point and an end point of the unevenness.

In a third variant the detected height profile is subjected to a phase-free low-pass filtering, which can include a forward-backward-filtering, a moving-average-filtering, i.e., a filtering with a floating-mean-value filter or a weighted floating average value filter and/or a convolution with a function. In addition an analysis of the first and second derivative of this filtered height profile or the convolution of the height profile with the above-mentioned function is performed, whose course corresponds to a course of the height profile. Curves resulting therefrom are analyzed for the presence of maxima and minima. At least one derivative, i.e., either only the first derivative, only the second derivative or both derivatives are used for determining the starting and end point of the unevenness. In addition the height profile can be filtered with a modified frequency and again its first and second derivative be analyzed, which allows determining a start and/or end of the unevenness.

Beside the combination of the variants it is also possible to combine at least one of the presented variants for analyzing the height profile with video-based information, which can indicate color changes of the road, in order to thus be able to draw conclusions regarding the occurrence of unevennesses.

Further advantages and embodiments of the invention will become apparent from the description and the included drawing.

Of course the features mentioned above and explained below may not only be used in the respectively stated combination, but also in other combinations or by themselves, without departing from the scope of the present invention.

BRIEF DESCRIPTION OF THE DRAWING

The invention is schematically illustrated in the drawings by way of embodiments and is described schematically and in detail with reference to the drawings.

DETAILED DESCRIPTION OF PREFERRED EMBODIMENTS

Figure 1:
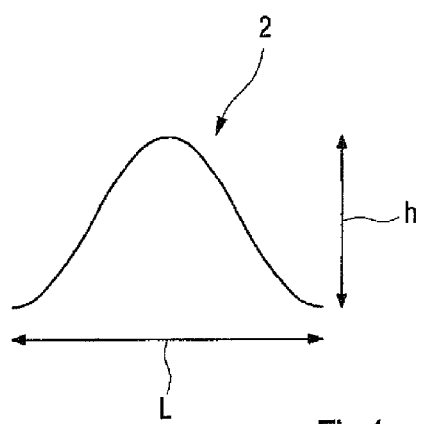
FIG. 1 shows different examples for target geometries of an unevenness of a height profile of a subsurface on which a motor vehicle drives, which target geometries are taken into account in a first embodiment of the method according to the invention.
Figure 1:
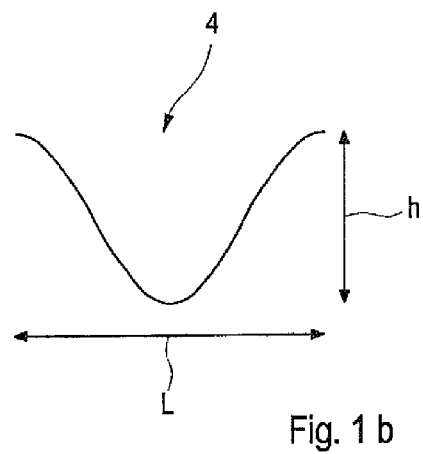
Figure 1:
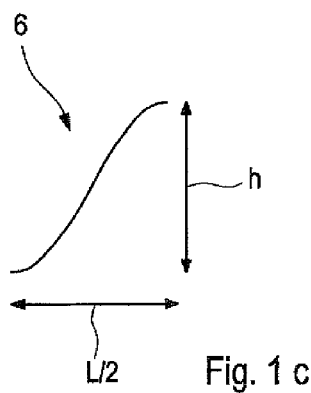
Figure 1:
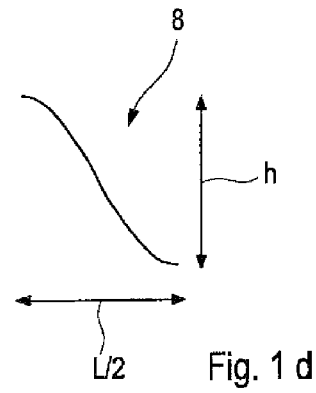

The examples for unevennesses 2, 4, 6, 8 shown in the FIGS. 1a, 1b, 1c and 1d along a height profile of a subsurface on which a motor vehicle drives, are defined among other things by their length L in horizontal direction along the height profile of the subsurface and by their height h in vertical direction perpendicular to the height profile and thus perpendicular to the subsurface. Hereby FIG. 1a shows a positive unevenness 2, FIG. 1b a negative unevenness 4, FIG. 1 an unevenness 6, which is configured as a positive edge and FIG. 1d an unevenness 8, which is configured as a negative edge.

Each here shown unevenness 2, 4, 6, 8 has a defined geometry and thus a target geometry, which can be defined by a parameter-dependent function, for example a polynomial of the n-th degree, which is dependent on a parameter $a_k$ with members $a_k * X^k$.

All diagrams of the FIGS. 2a, 2b, 2c and 2d include respectively an abscissa 10 along which values for a position x along a subsurface on which the motor vehicle drives, are plotted in the unit cm. The diagrams of FIGS. 2a and 2c include an ordinate 12 along which values for a height of a height profile along the subsurface are plotted in the unit cm. In the diagrams of FIGS. 2b and 2d respectively values of a local or position-dependent change and thus a first derivative of the values of the height profile are shown along ordinates 14 in a unit-free value.

Hereby it is also possible to adjust the actual geometry to the height profile of the subsurface. Hereby for displaying the actual geometry or the target geometry also a trigonometric function h(x) can be used for which the relationships $h(x) = h_{max}(1 - \cos(2\pi x/L))$ for $x \leq L \leq 0$ and otherwise $h(x) = 0$ applies. Hereby values for $h_{max}$, which describes a maximal value of the height to be defined, and varies for L, for example, can be halved. A provided target geometry is shifted along the actual geometry, wherein a difference between the actual geometry and the target geometry is calculated. From the summed up quadrated values of the differences an unevenness can be identified by comparison with the provided threshold.

The diagram of FIG. 2a shows a first curve 16, which is based on sensorically measured values of a height profile, which in this case has a positive unevenness. A second curve 18 in FIG. 2a is based on a low-pass filtering of the values of the height profile represented by the first curve 16 and a third curve 20 is based on a second low-pass filtering of these values. In addition the diagram of FIG. 2a shows a first and a second, here vertically oriented, delimiting line 22, 24 which here delimit the unevenness along the height profile.

In the diagram of FIG. 2b local derivatives and thus gradients of the first low pass filtered curve 18 of FIG. 2a are represented by a first derived curve 26 and of the second low pass filtered curve 20 by a second derived curve 28. Further in the first derived curve 26 a first delimiting line 30 and a second delimiting line 32 are assigned. Assigned to the second derived curve 28 are a first delimiting line 34 and a second delimiting line 36. Hereby extrema of the curves 26, 28 demarcate these delimiting lines 30, 32, 34, 36.

The diagram of FIG. 2c shows a first curve 38, which is based on sensorically measured values of the height profile, which in this case has a positive edge as unevenness. A second curve 40 in FIG. 2c is based on a first low-pass filtering of the values of the height profile represented by the first curve 38 and a third curve 42 is based on a second low-pass filtering of the values of the second curve 40. In addition the diagram of FIG. 2c shows first and second, here vertically oriented, delimiting lines 44, 45, which in this case delimit the unevenness along the height profile.

Figure 2:
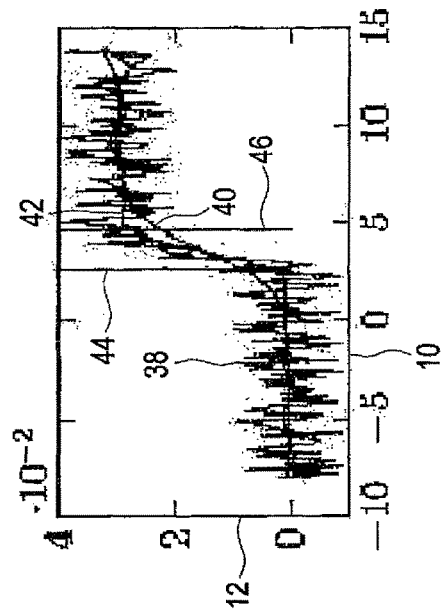
FIG. 2 shows diagrams for analyzing a height profile of a subsurface on which a motor vehicle drives according to a second embodiment of the method according to the invention.
Figure 2:
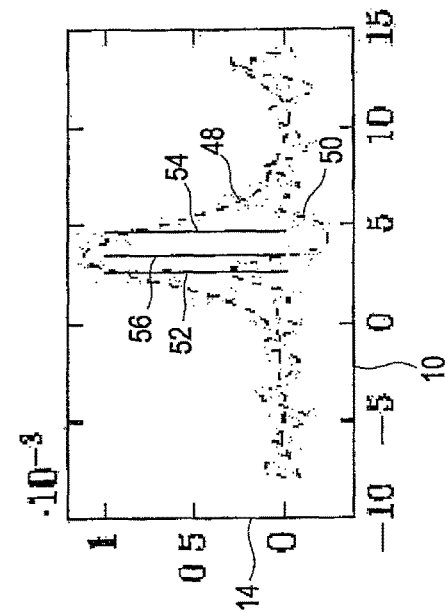
Figure 2:
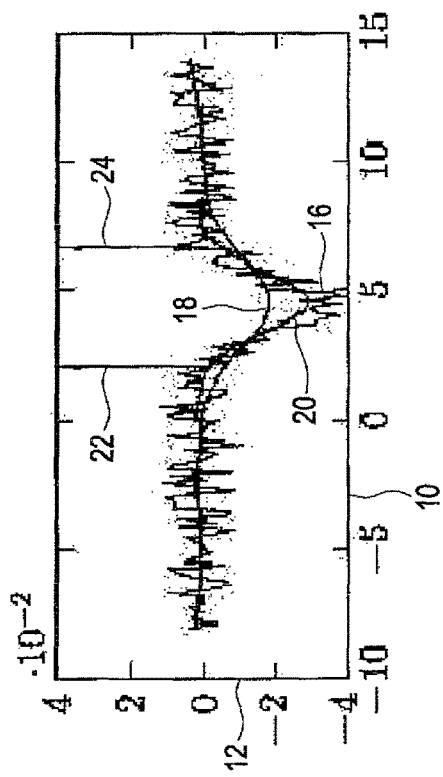
Figure 2:
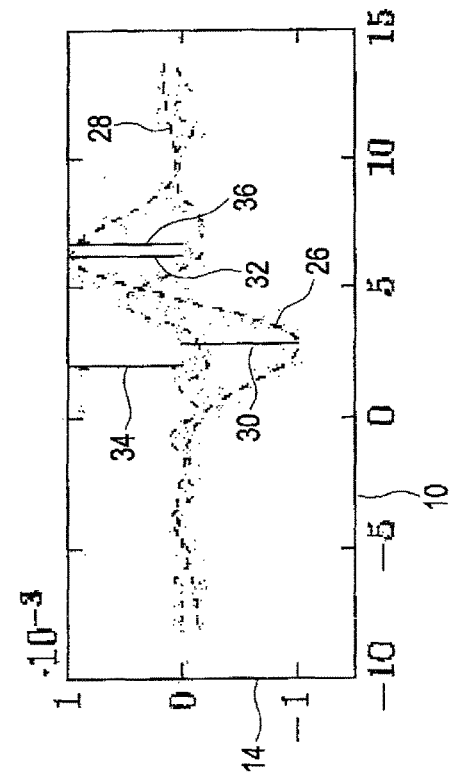

In the diagram of FIG. 2d local derivatives, and thus gradients of the first low-pass filtered curve 450 of FIG. 2, are represented by a first derived curve 48 and the second low-pass filtered curve 42 by a second derived curve 50. Further assigned to the first derived curve 48 is a first delimiting line 52 and a second delimiting line 54. Assigned to the second derived curve 50 is in this case a delimiting line 56.

The curves 16, 38 which are shown in FIGS. 2a and 2c and are based on sensorically measured values of the height profile and the curves 18, 20, 40, 42 derived therefrom by once or twice low-pass filtering, can be analyzed by a weighting function G(x).

The following Table 1 exemplarily shows how potential unevennesses of the height profile can be recognized by analyzing the first or second derivative of the filtered height profile, which for examples corresponds to the curves 26, 28, 40, 42 of FIGS. 2b and 2d, wherein the filtering of the height profile was performed with a moving-average or weighted floating-mean value with a weighted function G(x).

This weighing function G(x) is used to filter the height profile and/or the function for describing the height profile phase-free and to query the height profile or the function for describing the height profile for extrema, which provide information regarding where the unevenness starts and ends. Hereby G(x) can be a Gauss function.

TABLE 1

| Analysis of the first derivative of the filtered height profile | Analysis of the second derivative of the filtered height profile | unevenesses |
| --- | --- | --- |
| {max min} | {max min max} | Positive unevenness delimited by [max max] of the second derivative of the filtered height profile |
| {min max} | {min max min} | Negative unevenness delimited by [min min] of the second derivative of the filtered height profile |
| {max} | {max min} | Positive edge delimited by [max min] of the second derivative of the filtered height profile |
| {min} | {min max} | Negative edge delimited by [min max] of the second derivative of the filtered height profile |

Figure 3:
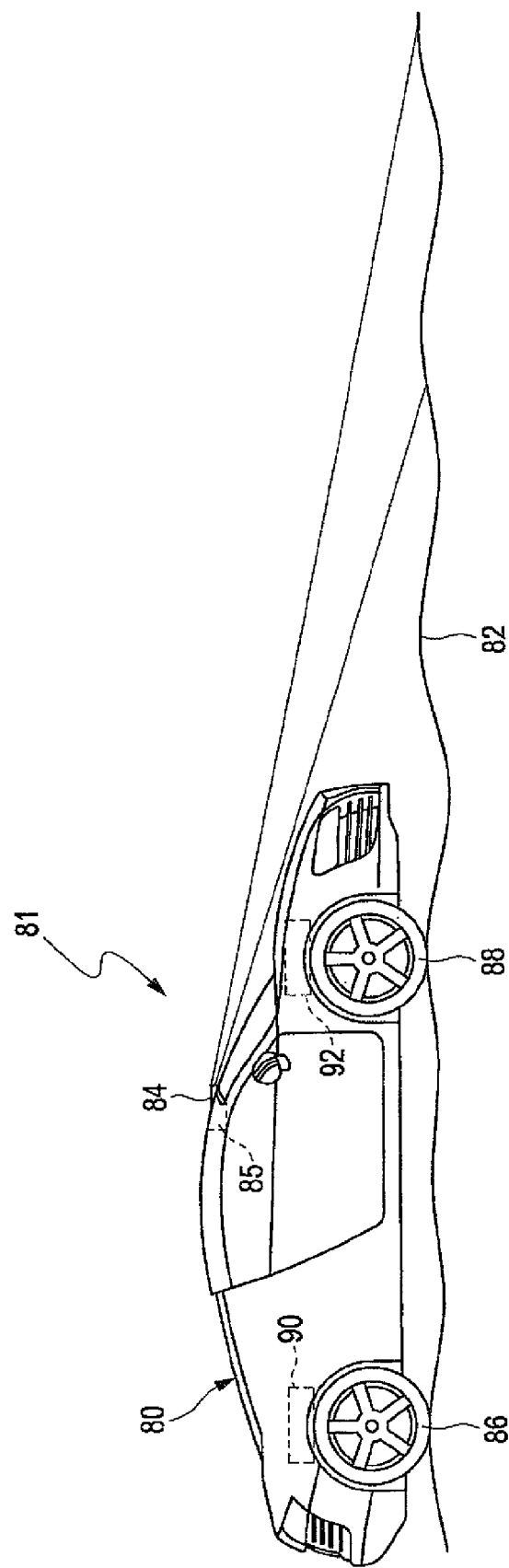
FIG. 3 shows a schematic representation of a motor vehicle with an embodiment of a system according to the invention.

FIG. 3 shows a schematic representation of a motor vehicle 80, which drives along a subsurface 82. This motor vehicle 80 includes an embodiment of the system 81 according to the invention with a sensor 84 and a data processing device 85. The sensor 84 is configured to analyze an environment of the motor vehicle 80 based on electromagnetic waves and based thereon to detect a height profile of the subsurface 82. The data processing device 85 is configured to determine an actual geometry of the height profile and to compare it with a defined target geometry. In this case examples for target geometries are stored in a memory of the data processing device 85. In addition the motor vehicle 80 includes a plurality of wheels 86, 88 of which in FIG. 3 only two are shown. Also an actuator 90, 92 as a component of the chassis of the motor vehicle 80 is assigned to each wheel 86, 88, wherein one actuator 90, 92 is assigned to a wheel 86, 88 and is configured to impinge this wheel 86, 88 in dependence on an unevenness identified along the subsurface 82.

The invention claimed is:

1. A method for controlling at least one actuator of a chassis of a motor vehicle, which drives on a surface, comprising:
   detecting a height profile of the surface;
   describing a shape of the height profile along a section of the height profile with a function which depends from at least one parameter and which, for a point of the surface, defines a dependency of the height profile from a position of the point along the section;
   identifying the section as an unevenness of the surface when a value of a change of the function in dependence of the position of the point along the section deviates from a predetermined threshold value for the change of the function by a predetermined tolerance value; and
   setting a manipulated variable for impinging the at least one actuator by taking the unevenness into account, when the vehicle drives over an identified unevenness,
   wherein a first local derivative of the function in horizontal direction along the section is used as change of the function,
   wherein the function describes an actual geometry of the height profile, said method further comprising comparing the actual geometry with a target geometry provided for the height profile, wherein the section is identified as unevenness of the surface when the actual geometry deviates from a threshold value predetermined for the target geometry by a tolerance value predetermined for the target geometry.

2. The method of claim 1, wherein values of the height profile for the surface are determined with a sensor for detecting an environment of the motor vehicle.

3. The method of claim 2, further comprising filtering the determined values along the section.

4. The method of claim 1, wherein a second local derivative of the function in horizontal direction along the section is used as change of the function.

5. The method of claim 1, wherein a shape of the actual geometry and a shape of the target geometry are defined by the function for describing the height profile along the section, and wherein for describing the actual geometry the at least one parameter has an actual value and for describing the target geometry the at least one parameter has a target value.

6. The method of claim 1, further comprising defining a start and an end for the unevenness in horizontal direction along the section.

7. The method of claim 1, further comprising using the target geometry as a template for the actual geometry.

8. A system for controlling at least one actuator of a chassis of a motor vehicle, which drives on a surface, said system comprising:
   at least one sensor for detecting an environment of the motor vehicle and configured to detect a height profile of the surface; and
   a data processing device, configured
   to describe a shape of the height profile along a section with a function which depends from at least one parameter which, for a point of the surface, defines a dependency of the height profile from a position of the point along the section and which describes an actual geometry of the of the height profile,
   to identify the section as an unevenness of the surface when a value of a change of the function in dependence of the position of the point along the section deviates from a predetermined threshold value for the change of the function by a predetermined tolerance value;
   to set a manipulated variable for impinging the at least one actuator by taking the unevenness into account, when the vehicle drives over an identified unevenness, and
   to compare the actual geometry with a target geometry provided for the height profile, wherein the section is identified as unevenness of the surface when the actual geometry deviates from a threshold value predetermined for the target geometry by a tolerance value predetermined for the target geometry.

9. The system of claim 8, said system being arranged in the motor vehicle.

* * * * *